United States Patent
White

(10) Patent No.: US 8,805,662 B2
(45) Date of Patent: Aug. 12, 2014

(54) SYSTEM AND METHOD FOR JOINT MOTION SIMULATION

(75) Inventor: Bruce F. White, Boston, MA (US)

(73) Assignee: Advanced Mechanical Technology, Inc., Watertown, MA (US)

( * ) Notice: Subject to any disclaimer, the term of this patent is extended or adjusted under 35 U.S.C. 154(b) by 331 days.

(21) Appl. No.: 12/942,886

(22) Filed: Nov. 9, 2010

(65) Prior Publication Data

US 2011/0118878 A1 May 19, 2011

Related U.S. Application Data

(60) Provisional application No. 61/259,360, filed on Nov. 9, 2009, provisional application No. 61/286,672, filed on Dec. 15, 2009.

(51) Int. Cl.
*G06G 7/58* (2006.01)

(52) U.S. Cl.
USPC .............................................. 703/11

(58) Field of Classification Search
USPC .............................................. 703/11
See application file for complete search history.

(56) References Cited

U.S. PATENT DOCUMENTS

| | | | |
|---|---|---|---|
| 5,014,719 A | 5/1991 | McLeod | |
| 5,127,420 A | 7/1992 | Horvath | |
| 2007/0051180 A1 | 3/2007 | White | |

FOREIGN PATENT DOCUMENTS

CN 101 357 085 A 2/2009

OTHER PUBLICATIONS

White et al.; A simulator study of TKR kinematics using modeled softtissue constraint: Virtual soft-tissue control for knee simulation; Journal of Testing and Evaluation, Sep. 2006 vol. 3, Issue 8; pp. 1-17.*
Chen et al.; A Computational Model of Postoperative Knee Kinematics; Medical Image Analysis 5 (2001) 317-330.*
International Search Report and Written Opinion, PCT/US2010/056062, date of mailing May 25, 2011, 9 pages.
Fujie, H., et al., "The Use of Robotics Technology to Study Human Joint Kinematics: A New Methodology," *J. of Biomechanical Engineering*, 115: 211-217 (Aug. 1993).
Fujie, H., et al., "Forces and Moments in Six-DOF at the Human Knee Joint: Mathematical Description for Control," *J. Biomechanics*, 29(12): 1577-1585 (1996).

(Continued)

*Primary Examiner* — Hugh Jones
(74) *Attorney, Agent, or Firm* — Hamilton Brook Smith & Reynolds, PC

(57) ABSTRACT

A simulator for driving a prosthetic element includes a prosthetic drive mechanism that drive the prosthetic element during an accelerated wear test of the prosthetic element. A simulation input represents the action of the simulator and a sensor mechanism is used to measure the force and torque applied to the prosthetic element. Position and orientation control sensors are further used to measure displacement of the prosthetic element. A closed loop feedback control system, responsive to the sensors, is used to determine a drive signal for the drive mechanism. The control system advantageously adds a computational model that incorporates mechanical representations of ligament fibers. The computational model is a non-human approximation to situations that would be encountered by the prosthesis within the human body and includes dimensional geometry of insertion sites and mechanical properties of ligament fibers. The computational model is responsive to the position and angular displacement sensors to determine constraint forces and torques of ligaments that mitigate action of the control system. The action of the control system may further be mitigated by the measured force and torque.

17 Claims, 12 Drawing Sheets

(56) References Cited

OTHER PUBLICATIONS

Fujie, H., et al., "The Use of a Universal Force-Moment Sensor to Determine In-Situ Forces in Ligaments: A New Methodology," *J. of Biomechanical Engineering*, 117: 1-7 (Feb. 1995).

Joshi, A.R., "Design and Control of a Three Degree-of-Freedom Planar Parallel Robot," A Thesis Presented to the Faculty of the Fritz J. and Dolores H. Russ College of Engineering and Technology, Ohio University (Aug. 2003), 57 pp.

Wenger, P., et al., Kinematic analysis of a class of analytic planar 3-R PR parallel manipulators, *International Workshop on Computational Kinematics*, Duisburg : Germany (2009), pp. 1-8.

Gosselin, C., et al., "A planar parallel 3-DOF cable-driven haptic interface," *Proceedings of the 12th Word Multi-Conference on Systemics, Cybernetics and Informatics; Jointly with the 14th International Conference on Information Systems Analysis and Synthesis*; WMSCI 2008, 6 pages.

Li, G., et al., "Cruciate-Retaining and Cruciate-Substituting Total Knee Arthroplasty," *The J. of Arthroplasty*, 16(8) Suppl. 1: 150-156 (2001).

Li, G., et al., "The importance of quadriceps and hamstring muscle loading on knee kinematics and in-situ forces in the ACL," *J. of Biomechanics*, 32: 395-400 (1999).

Li, G., et al., "Knee Kinematics with a High-Flexion Posterior Stabilized Total Knee Prosthesis: An in Vitro Robotic Experimental Investigation," *The J. of Bone & Joint Surgery*, 86-A(8): 1721-1729 (Aug. 2004).

Williams II, R.L., et al., "Inverse Kinematics for Planar Parallel Manipulators," *Proceedings of DETC '97*, 1997 ASME Design Technical Conferences, Sep. 14-17, 1997, Sacramento, California, pp. 1-6.

Chandra, R., et al., "Solving the Forward Kinematics of the 3 RPR Planar Parallel Manipulator using a Hybrid Meta-Heuristic Paradigm," *CIRA 2009*, Korea, Dec. 15-18, 2009, pp. 177-182.

Rudy, T.W., et al., "A Combined Robotic/Universal Force Sensor Approach to Determine In Situ Forces of Knee Ligaments," *J. Biomechanics*, 29(10): 1357-1360 (1996).

Rudy, T.W., et al., "The effect of the point of application of anterior tibial loads on human knee kinematics," *J. of Biomechanics*, 33: 1147-1152 (2000).

\* cited by examiner

SYSTEM AND METHOD FOR JOINT MOTION SIMULATION

RELATED APPLICATIONS

This application claims the benefit of U.S. Provisional Application No. 61/259,360, filed on Nov. 9, 2009, and U.S. Provisional Application No. 61/286,672, filed on Dec. 15, 2009, the entire teachings of which are incorporated herein by reference.

BACKGROUND

Prosthetic implant failure mechanisms are numerous. Among the most prevalent causes of failure are polyethylene wear, aseptic loosing, infection, and mal-alignment. Polyethylene wear comprises the largest single identifiable cause of implant failure today. Moreover, polyethylene wear can predispose implants to loosing as a result of increased loading of the reformed tissues. As implant technology evolves, new and more complex modes of wear, damage, and failure are being identified. As a consequence of these facts, there is a great need for rigorous implant life cycle testing in simulator machines that are capable of replicating the subtleties of human motion.

Simulator machines address the implant longevity problem by providing a non-human environment in which new and existing prosthetic devices are evaluated using accelerated life testing. These machines allow researchers to isolate and study design deficiencies, identify and correct materials problems, and ultimately provide physicians and patients with longer life prosthetic systems. Simulator machines approximate human joint motion. Clearly, the closer the approximation of human joint motion, the more reliable the results.

To date, simulator machines have at best provided only a very rough approximation of the complexity of human joint motion, such as knee motion. Available displacement controlled machines rely on an a priori description of the kinematics of the relevant body part, making little or no allowance for variations in prosthetic design, and subject the implant device to these prescribed motions for the duration of the life cycle test. Other machines use a force control system that subjects the prosthetic device to an ensemble of forces and torques that represent those encountered in the body part (e.g. a knee) during physiologic motion. Once implanted in the patient, however, the prosthetic is supported and constrained by the soft tissues of the body. Hence, for improved accuracy, force controlled machines should in some way simulate the natural constraints of these soft tissue forces. Some simulator machines have attempted to provide such constraints with a complex system of mechanical springs. However, these springs have proven cumbersome to work with, and have only a limited capability of simulating the complex characteristics of the human body, such as the knee's soft tissue.

FIG. 1 illustrates an example of a prosthetic simulator testing machine 10 that may be used with embodiments of the present invention. As described in U.S. Pat. No. 7,823,460, the teachings of which are incorporated by reference in its entirety, a prosthetic simulator 10 is a non-human environment used for testing prosthetic devices, particularly implant devices, such as prosthetic knees, in a manner that approximates the conditions within the human body. The simulator 10 is preferably capable of performing "accelerated wear" tests, in which the prosthesis is put through a large number of cycles (e.g. 20 million cycles) of pre-determined motions that are likely to be encountered in the human body. In the embodiment shown in FIG. 1, the simulator 10 comprises three stations 11a, 11b, 11c, each having one or more actuators, such as servo-hydraulic actuators, for driving a prosthesis to simulate various types of body motions. It will be understood that a simulator according to can have any number of stations.

FIG. 2 illustrates a schematic 200 of an example of a simulator station 11 for a prosthetic knee implant. This schematic 200 illustrates the typical controlled and uncontrolled degrees of freedom of the knee simulator. Force control of knee simulators, such as those illustrated in FIGS. 1-2, relies on the principle of equipollence to reduce the complex system of forces acting across the knee to a system of orthogonal forces consistent with the actions of the machine's mechanical actuators. The forces across the knee may be aggregated into three groups: 1) the active forces of the musculature; 2) the passive forces of the ligamentous and capsular structures; and 3) the contact forces acting on the articular surface.

In typical simulation devices, the machine's actuators have been used to simulate the active forces, a hardware constraint system (such as a mechanical spring arrangement) is used to simulate the passive forces, and the contact forces result directly from tibial-femoral contact.

A virtual soft tissue control system may utilize similar partitioning of the forces but adopts a flexible model-based software system rather than the simple mechanical spring arrangement for soft tissue constraint. The modeled soft tissue constraint provides the opportunity for realistic soft tissue approximation incorporating nonlinear, asymmetric features of the soft tissue forces.

FIG. 3 is a schematic of a control system 300 for a prosthetic simulator. The prosthetic simulator stage 11 is driven by one or more servo-hydraulic actuators 15 under the control of a digital control system 101. As described in further detail below, the control system according to this embodiment includes both a virtual soft tissue model system, and an iterative learning control system.

The simulator includes a multi-axis force/torque transducer 19 mounted beneath the tibial tray of the simulator stage so that the three components of femoral-tibial contact force (and moment) can be monitored. Transducer 19 can be a six-channel strain gauge transducer.

The simulator can also include one or more position sensors or transducers 21 to measure the relative translational and rotational positions of the femoral 22 and tibial 23 components of the simulator. The position sensor 21 preferably monitors the flexion/extension angle 31, internal/external (IE) rotation angle 33, anterior/posterior (AP) translation 35, and vertical (compression/distraction) position 37 of the prosthesis (shown in FIG. 2). The medio-lateral (ML) knee translation 39 and rotation 41 may also be monitored.

The force transducer 19 and position sensor(s) 21 provide feedback data regarding the forces and motions of the prosthesis at the simulator stage 11.

The virtual soft tissue control system 300 includes a nested loop design. The nested loop design includes an inner loop 7 and an outer loop. The inner loop 7 obtains a feedback from the multi-axis force/torque transducer 19 and provides traditional proportional, integral, derivative control (PID) via a discrete numeric algorithm. The inner loop 7 provides force control of the servo-hydraulic actuator 15. An input to the inner loop 7 represents a force set point or time varying force waveform. Under force control alone, the closed loop servo-hydraulic system attempts to drive the machine's actuator until the output of the force transducer is equal to the force set point.

The virtual soft tissue algorithm is implemented in the outer loop 9 of the nested loop design. The outer loop 9 derives its feedback from a position transducer 21, or an angular position transducer in the case of interior-exterior (IE) rotation. This position feedback provides the input to a piecewise cubic spline interpolation algorithm 8 that, by proper choice of coefficients, can be programmed to represent the variety of soft tissue force displacement relationships encountered in a human body. The piecewise cubic spline coefficients can be calculated offline, based on the desired soft tissue model, and subsequently downloaded to the controller. The cubic spline algorithm may is shown using a transfer function 8, F=S(x). The spline interpolation algorithm establishes a relationship between the current configuration of the simulator device (where configuration means the relative positions and orientation of the prosthetic components) and the constraint force which emulates the elastic restoring force of the knee's soft tissue. The calculated constraint force is subtracted from the reference force or torque waveform 6, and the residual is passed to the input of the inner loop 7, where it becomes the reference input to the force control portion of the control scheme.

Each controlled degree of freedom is equipped with its own independent control loop, a single channel of which is schematically depicted in FIG. 3. In certain embodiments, a single control variable drives each of the spline approximation algorithms. In other embodiments, multiple inputs can be used to accommodate the complexity of the articulations of the knee.

The digital signal processor code may implement eight synchronized arbitrary waveform generators (not shown) that are used to provide the driving signals for the simulator's actuators 15. Each waveform generator may be programmed via a 256-point array of data downloaded from a computer. This data provides a template for the repetitive control of the associated digital to analog converter (DAC) and the connected actuator. A 24-bit phase generator scheme provides waveform periods from several hours to 0.33 seconds. The waveform generator may utilize a first order interpolation scheme to determine intermediate values between template array points. The waveform generator outputs may be mapped to digital proportional integral derivative (PID) calculation block inputs.

In one example, eight PID calculation blocks which implement the parallel form PID control algorithm are available to provide closed loop control of the machine's actuators. The PID calculation block inputs may be mapped to either a waveform generator block or another PID calculation block. Similarly the PID calculation outputs may be mapped to another PID block input or directly to the systems output DACs. The PID calculation is implemented as shown in equation (a) below:

$$v_o = k_p e(t) + \frac{1}{t_i} \int e(t)_d t + t_d \frac{d}{dt} e(t) \quad \text{(a)}$$

where $v_o$ is the output voltage, $k_p$ is the proportional gain constant, $t_i$ is the integral time constant, $t_d$ is the derivative time constant and $e(t)$ is the error signal (the difference between the reference input and the feedback signals).

The soft tissue model is implemented, as shown schematically in FIG. 3, by cascading two PID control blocks. The inner loop PID calculation block is setup to provide traditional force control of the servo-hydraulic actuator by selecting the appropriate force or torque channel for feedback. The outer loop feedback source is acted upon by a cubic function as follows:

$$F = a_o + a_1 x + a_2 x^2 + a_3 x^3 \quad \text{(b)}$$

In this way, a position input is transformed into a constraining force analogous to the expected constraint of the soft tissue. The soft tissue model is implemented as an eight segment cubic spline algorithm. The input to the algorithm is the user-selected displacement input. Typically this will be the AP position signal or the IE angular position signal. The spline calculation is implemented as shown in equation (c). The coefficients $a_{jk}$ and the knots $t_k$ can be determined offline by a virtual soft tissue software on a computer when the programmed soft tissue model is downloaded to the control processor. A lookup table for the coefficients is indexed by the current value of x returned from the selected displacement transducer. Once the coefficients are determined, the cubic equation is evaluated via a computationally efficient form that requires only three multiply and accumulate cycles in the DSP. The following equation may be used to specify the cubic spline algorithm:

$$F = \begin{cases} a_{00} + a_{10}x + a_{20}x^2 + a_{30}x^3 \\ a_{01} + a_{11}x + \\ \ldots \\ a_{0k} + a_{1k}x + a_{2k}x^2 + a_{3k}x^3 \end{cases} \text{for} \begin{cases} t_o \leq x < t_1 \\ t_1 \leq x < t_2 \\ \\ t_{k-1} \leq x < t_k \end{cases} \quad \text{(c)}$$

SUMMARY

A simulator for driving a prosthetic element includes a prosthetic drive mechanism that drives the prosthetic element, a sensor that measures the force, including torque, applied to the prosthetic element, and a control system. The control system drives the prosthetic drive mechanism responsive to the sensor and a simulation input. The control system includes a computational model that incorporates a representation of a ligament.

The representations of the ligament may include three-dimensional geometry of the ligament, mechanical properties of the ligament, and properties of different fibers of the ligament. The geometry of the ligament may be defined by insertion sites at appropriate ends of the ligament. Each fiber may include different insertion sites. The simulator may include displacement sensors that measure displacement of the prosthetic element. The displacement sensors may include position and angular displacement sensors. The computational model may determine constraint forces or torques of ligaments that mitigate action of the control system responsive to displacement sensors.

The control system may include a nested loop design. Another aspect of the present invention relates to a control system for use in driving a prosthetic element. The control system may include a computational model that incorporates a representation of ligament. The representation of a ligament may include three dimensional insertion sites and mechanical properties of the ligament.

The computational model may be a software model of the soft tissue structure that incorporates models of ligaments and fibers, each having their own elastic and/or visco-elastic properties.

BRIEF DESCRIPTION OF THE DRAWINGS

The foregoing will be apparent from the following more particular description of example embodiments, as illustrated in the accompanying drawings in which like reference characters refer to the same parts throughout the different views.

The drawings are not necessarily to scale, emphasis instead being placed upon illustrating embodiments of the present invention.

FIG. 4D-a is an illustration of a multi-fiber ligament.

FIG. 4D-b is an illustration of the mathematical approximation of multi-fiber ligaments shown in 4D-a.

DETAILED DESCRIPTION

Figure 1:
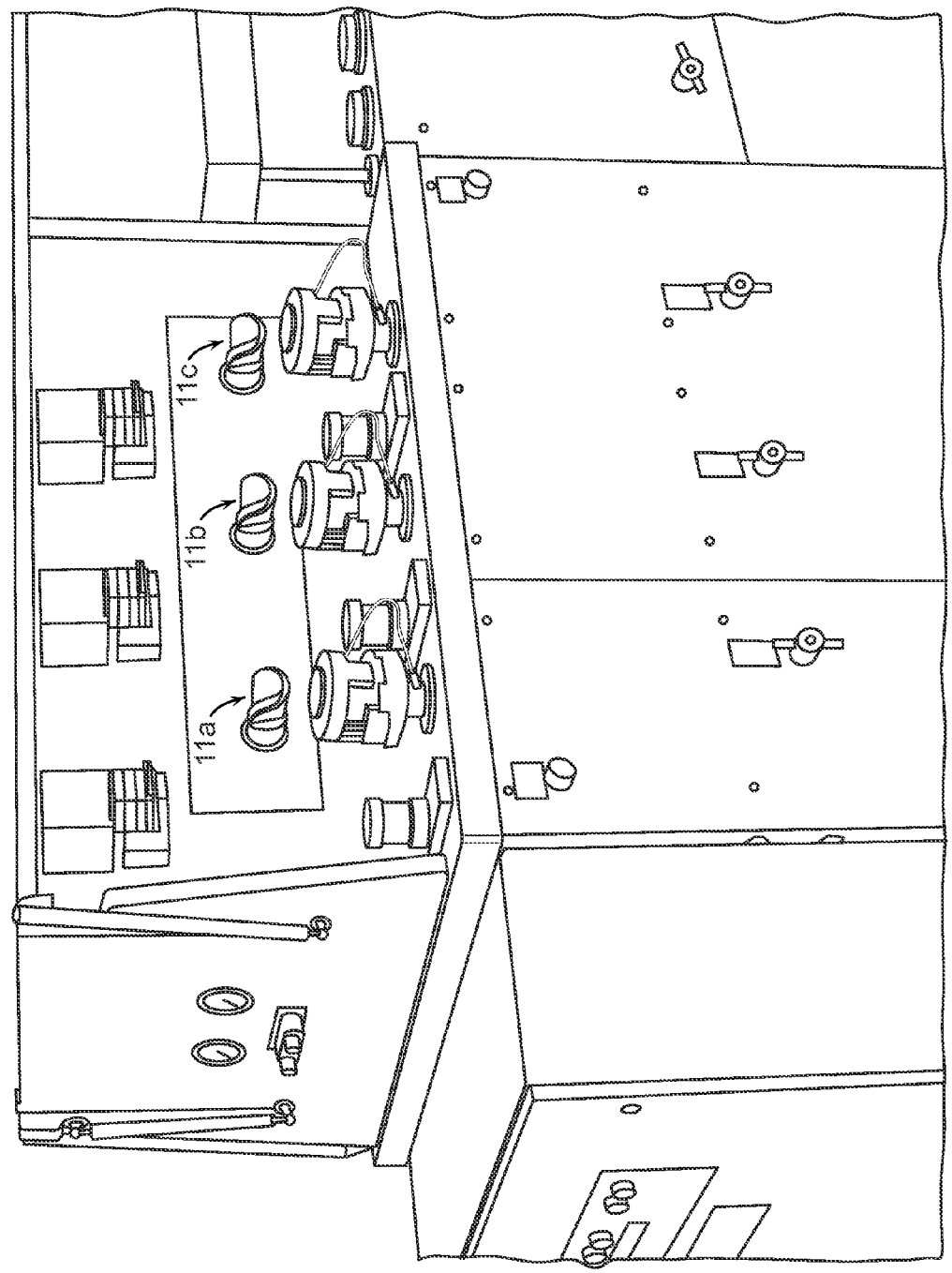
FIG. 1 illustrates a prosthetic simulator machine.
Figure 2:
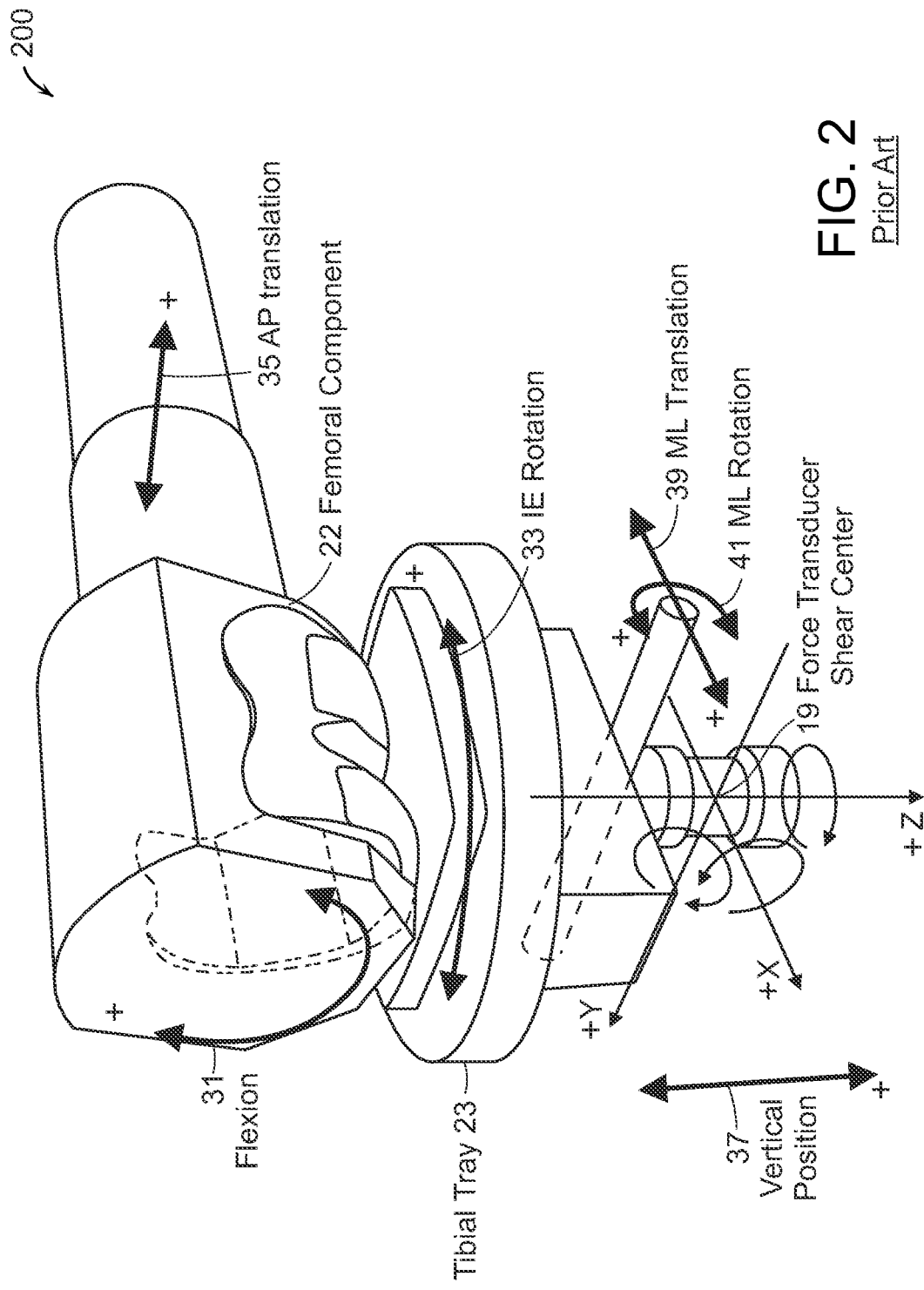
FIG. 2 is a schematic illustration of a simulator stage for a prosthetic device.

A description of preferred embodiments of the invention follows.

Example embodiments relate to prosthetic simulators, and in particular, methods and systems for controlling and testing prosthetic simulators. The prosthetic simulator can be used to closely approximate the conditions within the body, particularly with respect to human and animal joints, and can be used to test and evaluate prosthetics for use in various parts of a human or animal body. In the following description, a simulator for testing prosthetic knees is described, though it will be understood that the principles and embodiments described herein are readily applicable to prosthetic simulator devices for the hips, arms, shoulders, elbows, wrists, spines, ankles, temporo-mandibular joint, or any other articulating components of a human or animal body.

Embodiments of the present invention relate to a testing platform that replicates the mechanical conditions of use, under which implantable orthopedic prosthetic devices must perform in order to provide satisfactory long-term post surgical outcome. The testing platform combines a mechanical system capable of driving a prosthetic device to simulate joint motion with a computational algorithm capable of determining the structural response of the joint as well as a control system capable of providing the requisite control signals while accepting as an input a mathematical model representing one or more of the activities of daily living.

Certain embodiments may employ a computational model that is a mathematical representation of the soft tissue structure of the joint. The activity model is a mathematical model of the loads (and/or motions) required to perform a physiological activity. The total model comprises of the material (or physical) implant components, the computational soft tissue model, and the activity model. This computational/material hybrid modeling approach provides a test bed for mechanical simulation of joint motion to evaluate prosthetic devices for long-term durability, wear, fatigue and other damage modes. In general, the forces across a prosthetic element may be divided into two groups: those that are active and those that are reactive.

Active forces are defined as forces that arise from the effort of the musculature, body dynamics and gravitation. These forces are task specific and are characterized by the nature of the physiological activity in progress. Moreover, active forces of the knee are those forces necessary to carry out a specific physiological task.

Reactive forces are reactions of the mechanical structure of the knee to the applied loads. These responses are often governed by laws of elasticity, friction, and visco-elasticity and represent the response of the joint when the joint is deformed by the effort of the active forces. Reactive forces are said to balance or establish equilibrium with the active forces. The reactive forces may also be referred to as passive forces as they arise from passive structures.

The reactive forces may be divided into a) tension forces acting in the connective tissues and b) compressive and shear forces acting at the point of solid contact between the articular surfaces of the joint.

The forces acting on the connective tissues surrounding a prosthetic element are referred to as "passive" soft tissue forces and material contact forces are referred to as "contact" forces.

Certain embodiments partition the forces acting across a prosthetic element into active, passive and contact forces and require that these forces remain in equilibrium. Specifically, the equilibrium equation may be expressed as:

$$f_{active} + f_{passive} + f_{contact} = 0 \qquad (d)$$

where $f_{active}$ denotes active forces acting on the prosthetic element, $f_{passive}$ denotes passive forces of the prosthetic element, and $f_{contact}$ denotes contact forces of the prosthetic element. The term "force" as used herein may be at least one of axial compression or tension, shear, torsional moment (torque), and bending moment.

Figure 4A:
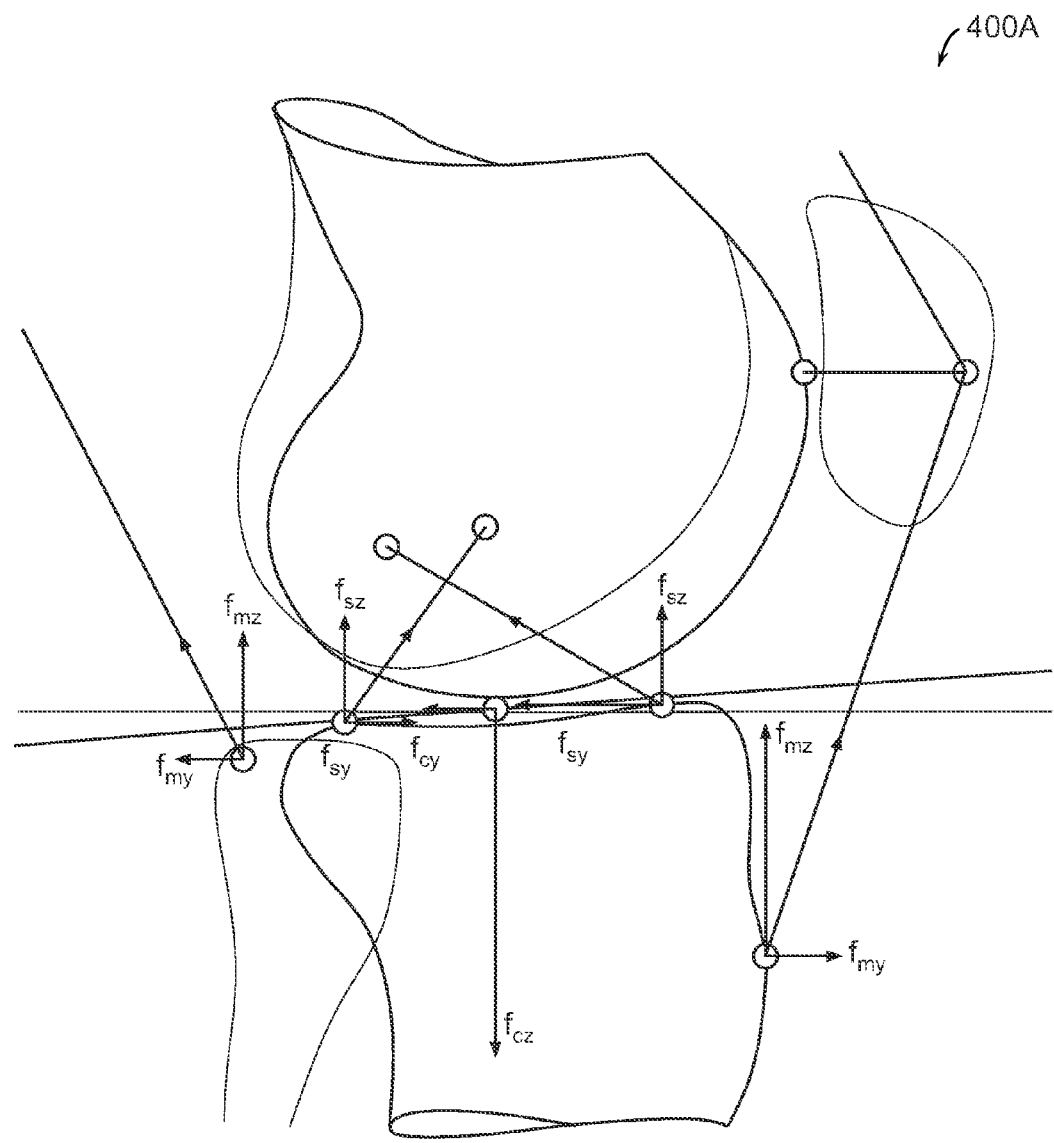
FIG. 4A is an illustration of the forces acting on a knee with each ligament represented as a single fiber.

FIG. 4A is an illustration 400A of the forces acting a knee. Specifically, FIG. 4A illustrates a sagittal plane view of a simplified knee with two ligaments and two muscles for visualization purposes. Elements labeled with subscript "m" (e.g., $f_{my}$, $f_{mz}$) represent muscle forces acting at the muscle tendon attachment sites. Elements labeled with subscript "c" (e.g., $f_{cy}$, $f_{cz}$) represent actual contact forces of the prosthetic system under test. Elements labeled with subscript "s" (e.g., $f_{sy}$, $f_{sz}$) represent soft tissue (e.g., ligament) forces. The passive force acting on the soft tissue is configuration or pose dependent (where configuration implies the relative position and orientation of the adjacent segments of the joint). The term "pose" refers to the current position and orientation of a rigid body in three-dimensional space relative to some reference frame (or reference pose). At any given pose, the attaching structural elements (ligaments) are elastically deformed such that tension is evoked in some or all of the elements. This tension may be resolved into orthogonal force components representing the passive ($f_{passive}$) forces. The passive forces are solely determined by the pose of the joint and may be calculated using an adequate structural model.

Equation (d) may be rearranged to show that the active force is equal and opposite to the sum of the constraint forces:

$$f_{active} = -(f_{passive} + f_{contact}) \qquad (e)$$

Considering the absolute values of the forces in equation (e), equation (d) may be rewritten as:

$$f_{active} - f_{passive} = f_{contact} \quad (f)$$

In certain embodiments, a simulator machine (shown later in relation to FIGS. 4D and 7) includes instrumentation to measure $f_{contact}$ (the real physical joint reaction force resulting from contact), while a control system (e.g., control system 300 shown in FIG. 3) is capable of calculating $f_{passive}$ using the soft tissue model and measurements of the current position and orientation of the prosthetic components.

The calculated passive force, $f_{passive}$, in turn is subtracted from the active force, $f_{active}$, to determine the magnitude of the force that must be applied to the prosthetic components to achieve equilibrium. Equation (f) serves as the equilibrium relationship and may be considered as a kernel of a virtual soft tissue control.

The soft tissue constraint model is a computational structural model of the joints soft tissue. The model includes computational algorithms that are used to calculate the tension in the connective tissue elements of the model. In one embodiment, the geometry of the model is determined from measurements of the current position and orientation of the prosthetic components as those components are physically exercised in the simulator machine. The model may also include a database of geometrical and mechanical information representing the anatomical and physical properties of the natural knee soft tissues.

Figure 4B:
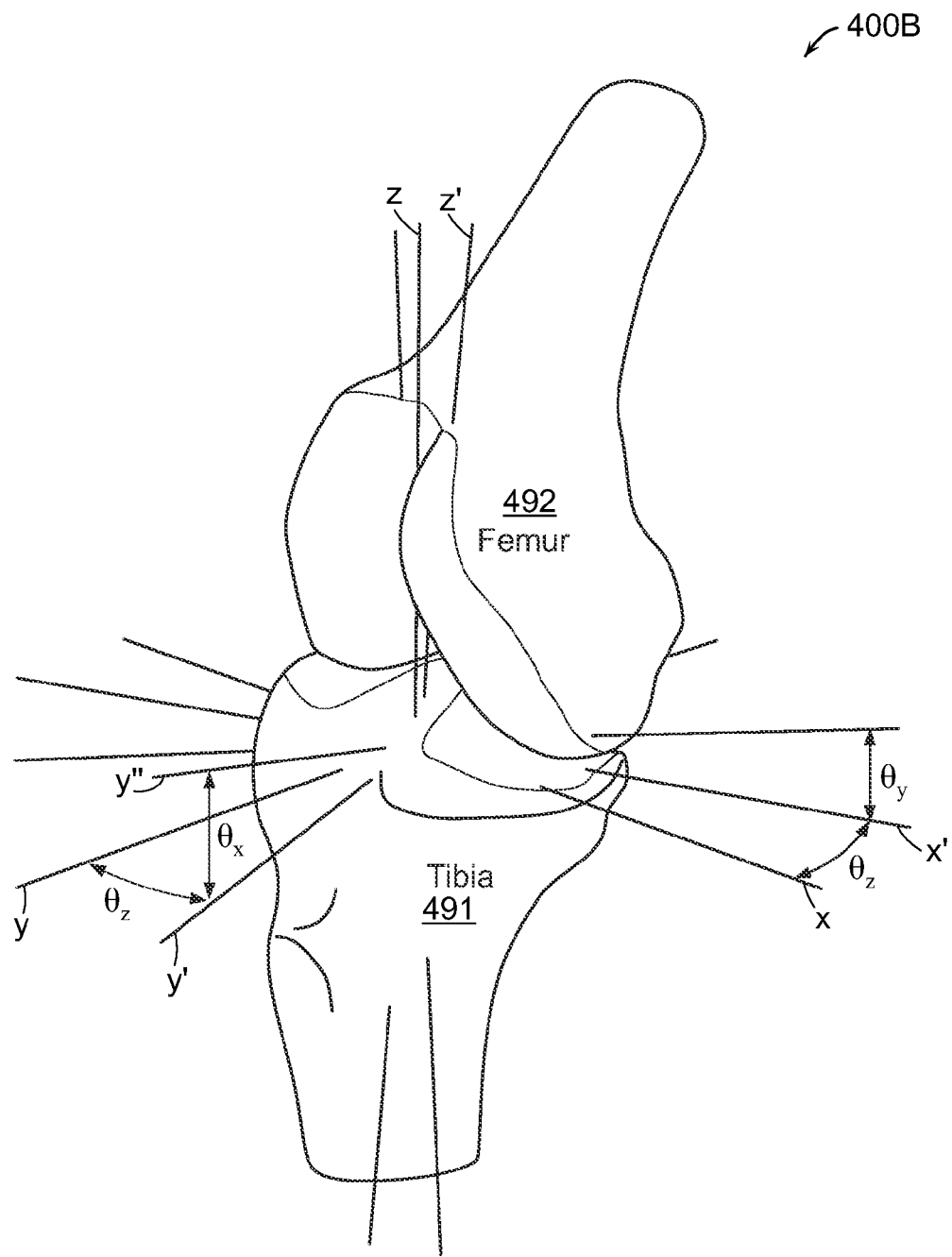
FIG. 4B illustrates the coordinate systems and transformations used by certain embodiments to describe knee motions.

FIG. 4B illustrates the coordinate systems and transformations 400B used by certain embodiments to describe knee motions adopted for use in a virtual soft tissue control system. Two coordinate systems, $O_T$ and $O_F$, are defined, where $O_T$ is affixed to and moves with the tibia 491 and $O_F$ is affixed to and moves with the femur 492. The two coordinate origins are coincident and the x, y, and z axes are initially aligned. The orientation of the femur relative to the tibia is determined by angles $\theta_x$, $\theta_y$, and $\theta_z$, which correspond to anatomical rotations of flexion-extension ($\theta_x$), varus-valgus rotation ($\theta_y$), and internal-external rotation ($\theta_z$) respectively. The axes of the rotated femur are illustrated by x', y', and z'.

A sequence of rotations taken through angles $\theta_x$, $\theta_y$, and $\theta_z$ about axes x, y, and z corresponds to a Cardan angle sequence (also known as Tait-Bryan angles). The rotation of the femur relative to the tibia may be described in matrix form as a rotational transformation R:

$$R = \begin{bmatrix} C_{\theta z}C_{\theta y} & C_{\theta z}S_{\theta y}S_{\theta x} - S_{\theta z}C_{\theta x} & C_{\theta z}S_{\theta y}C_{\theta x} - S_{\theta z}S_{\theta x} \\ S_{\theta z}C_{\theta y} & C_{\theta z}S_{\theta y}S_{\theta x} + C_{\theta z}C_{\theta x} & S_{\theta z}S_{\theta y}C_{\theta x} - C_{\theta z}S_{\theta x} \\ -S_{\theta y} & C_{\theta y}S_{\theta x} & C_{\theta y}C_{\theta x} \end{bmatrix} \quad (g)$$

where $C_{\theta x} = \cos(\theta_x)$, $C_{\theta y} = \cos(\theta_y)$, $C_{\theta z} = \cos(\theta_z)$, $S_{\theta x} = \sin(\theta_x)$, $S_{\theta y} = \sin(\theta_y)$, and $S_{\theta z} = \sin(\theta_z)$. The matrix expression R defines a three-dimensional rotation of one rigid body relative to another. The translation of the femur 492 relative to the tibia 491 may also be described in matrix form as translational matrix A:

$$A = \begin{bmatrix} a_x \\ a_y \\ a_z \end{bmatrix} \quad (h)$$

The current configuration of the femur relative to the tibia may be described by six variables, $a_x$, $a_y$, and $a_z$ and $\theta_x$, $\theta_y$, and $\theta_z$, where the $a_x$, $a_y$, and $a_z$ terms represent the coordinates of a vector a extending from the tibial origin, $O_T$, to the femur fixed origin, $O_F$, and $\theta_x$, $\theta_y$, and $\theta_z$ terms represent the orientation of the femur 492 relative to the tibia 491, expressed in the three Cardan angles.

Ligament tissue exhibits non-linear stress-strain behavior, hysteresis, rate dependent stiffness, stress relaxation, and creep. A phenomenological approximation may be used to govern the mechanical behavior of individual ligament fibers over a range of conditions relevant to normal physiological function. For example, the time independent component of the stress strain relationship for ligament material has been expressed in the quadratic form as:

$$\sigma = k_1 \cdot \epsilon^2 \quad (i)$$

where $\sigma$ is the stress, $\epsilon$ is the strain and $k_1$ is the tangent stiffness.

This approximation accommodates the strain dependency of stiffness and may be fit to extensional stress-strain data. However, this approximation neglects the hysteresis phenomena, which may be relatively large and may influence kinematics and control significantly. Further, ligament may be better approximated by simple constitutive relationships with independent elastic and visco-elastic terms. Specifically the quadratic ligament of equation (i) may be written as:

$$\sigma = k_1 \cdot \varepsilon^2 \left( 1 + k_2 \cdot \left[ \ln\left( \frac{\varepsilon}{\frac{d\varepsilon}{dt}} \right) - \frac{1}{2} \right] \right) \quad (g)$$

where $\sigma$ is the stress, $\epsilon$ is the strain, $k_1$ and $k_2$ are material specific coefficients, and $$\frac{d\varepsilon}{dt}$$

represents the current strain. (Attributed to Bernstein, Kearsley and Zapas.)

Based on equation (g), a quadratic relationship that provides reasonably good fit over a limited range of strain and strain-rate may be obtained:

$$\sigma = (k_1 \cdot \varepsilon^2 + k_2 \cdot \varepsilon)\left(1 + k_3 \cdot \frac{d\varepsilon}{dt}\right) \quad (h)$$

where $k_1$ and $k_2$ are fitting coefficients for the non-linear elastic quantity and $k_3$ provides strain rate dependence and is set to a value less then one to ensure positive net force. The quadratic relationship (h) contains a time-independent quantity representing the strain-dependent stiffness (first term) and a time-dependent quantity providing strain-rate dependent stiffness and hysteresis (second term). This expression improves on equation (i), as it accommodates both strain-rate dependent stiffness and hysteresis behavior. This relationship is not a physical model and may have applicability limited to a bounded region of ligament behavior.

Figure 4C:
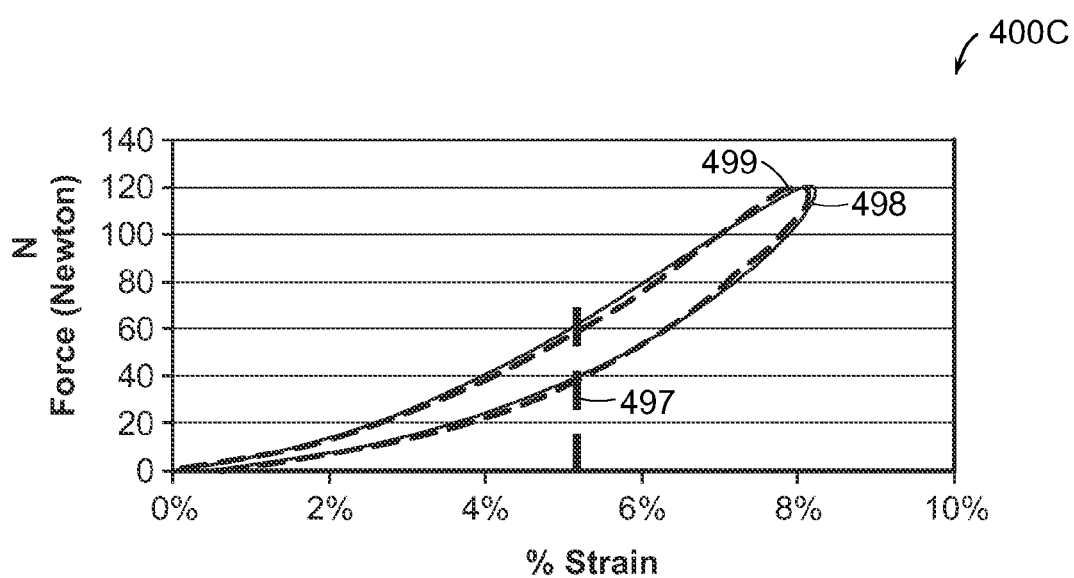
FIG. 4C includes plots that illustrate experimentally measured ligament force versus percentage strain of ligaments along with an approximation of this percentage strain, as may inform the multi-fiber ligament model.

FIG. 4C includes plots 400C that illustrate experimentally measured percentage strain 499 of ligaments along with an approximation 498 of this percentage strain obtained from equation (h). As shown in FIG. 4E, with properly selected choices for fitting coefficients $k_1$, $K_2$, and $k_3$, the modeled approximation closely follows the measured percentage strain over a wide strain range (i.e., at normal physiological strain rates). The damage threshold 497 represents a point at which significant ligament damage can occur. Any motion causing strain over the damage threshold may automatically terminate the test and cause a warning output.

In both natural and implanted knees, connective tissue joins the femoral and tibial segments of the joint and provides mechanical stability of the joint. This connective tissue includes ligaments bundles and sheath like capsular structures. The ligament bundles and sheath like structure, in turn, include tough elastic collagen fibers. These structures are collectively referred to as the soft tissue structure of the joint. These soft tissues are attached to the bony structures at what are called insertion sites. The insertion sites tend to be well defined and extend over finite areas on the bony surface. The ligaments may be envisioned as bundles of a large number of fibers extending from the proximal to the distal insertion sites. It has been demonstrated that reasonable mechanical models may be devised by reducing the number of fibers to a few with well-chosen insertion sites representative of the insertion geometry of the natural knee.

The mechanical properties of the ligaments are known from the testing of cadaveric ligament specimens. Each ligament may be subdivided into several fibers and be represented as a fiber bundle. Individual fibers of the bundle may be assigned elastic and visco-elastic properties so that the bundle collectively exhibits properties similar to the whole anatomical ligament.

It should be appreciated that while the multi-fiber ligament model will herein be described in connection with knee prosthetics, the multi-fiber ligament model may be used in conjunction with any other prosthetics known in the art which may be surrounded by ligament or joints during implantation.

Figure 4D:
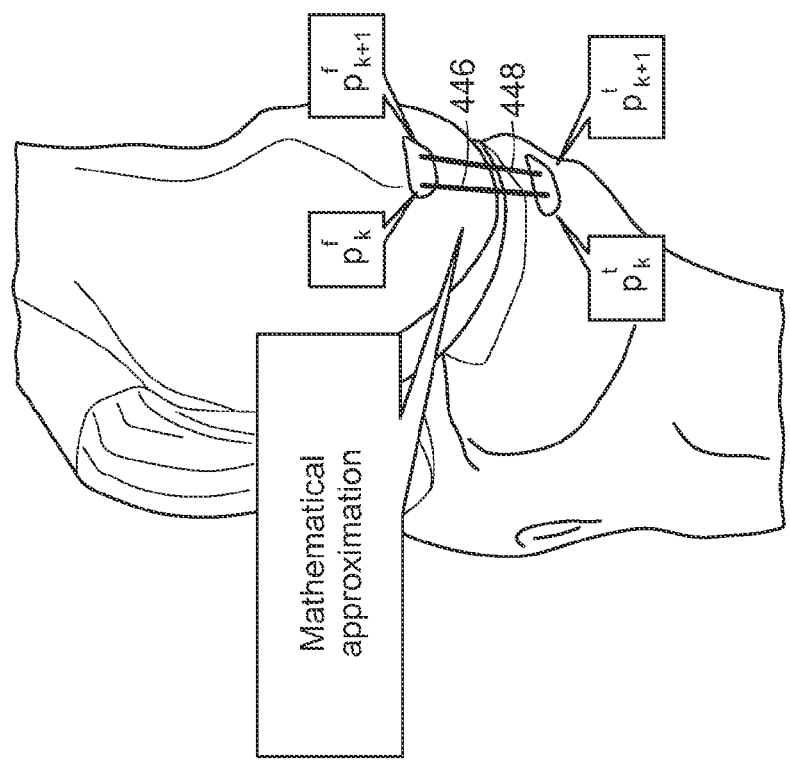
Figure 4D:
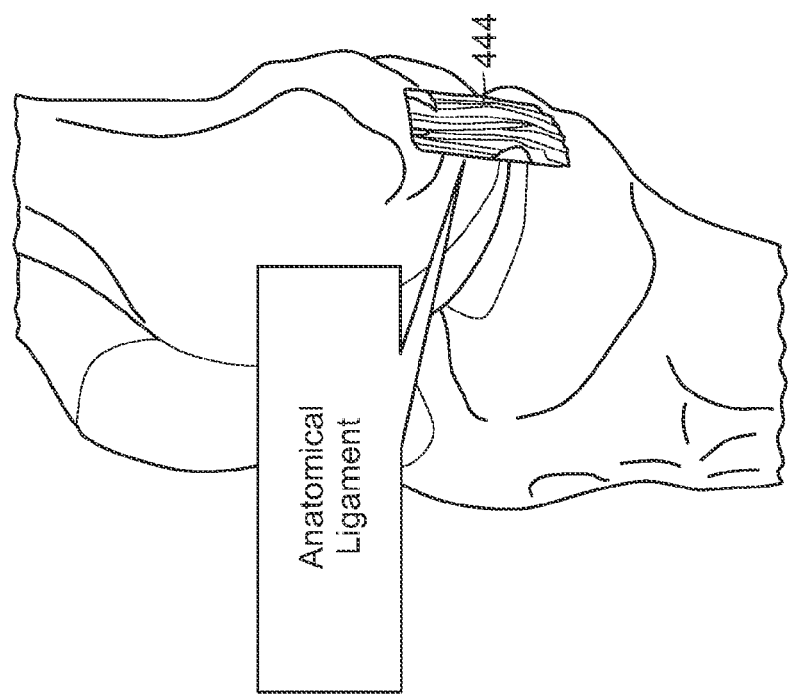
Figure 4E:
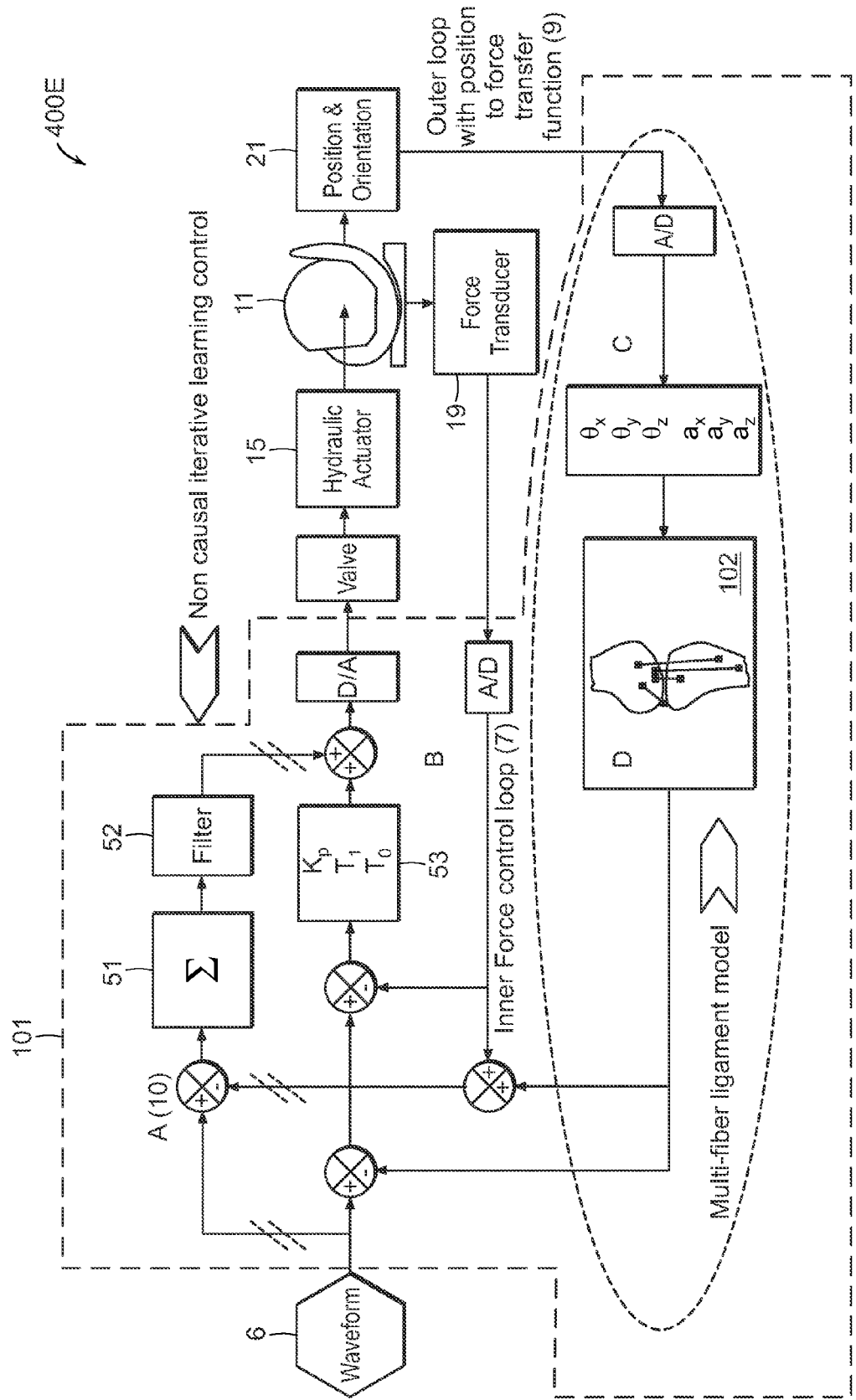
FIG. 4E is a schematic of a control system for a prosthetic simulator according to certain embodiments.

FIGS. 4D-a and 4D-b illustrate anatomical ligament insertion sites and their corresponding mathematical approximations. In both natural and implanted knees, connective tissue joins the femoral and tibial segments of the joint and provides mechanical stability of the joint. This connective tissue consists of ligaments bundles and sheath like capsular structures, all comprised of tough elastic collagen fibers. These structures are collectively referred to as the soft tissue structure of the joint. These soft tissues are attached to the bony structures at what are called insertion sites. The insertion sites tend to be well defined and they extend over finite areas on the bony surface. The ligaments themselves may be envisioned as bundles of a large number of fibers extending from the proximal to the distal insertion sites. It has been demonstrated that reasonable mechanical models may be devised by reducing the number of fibers to a few with well-chosen insertion sites representative of the insertion geometry of the natural knee. The mechanical properties of the ligaments are well known from the testing of cadaveric ligament specimens. Whole ligaments may be subdivided into several fibers so that each ligament is represented as a fiber bundle. Individual fibers of the bundle may be assigned elastic and visco-elastic properties so that the bundle collectively exhibits properties similar to the whole anatomical ligament.

This modeling is illustrated for a single ligament structure, the deep layer of the MCL (medial collateral ligament) 444 in the FIG. 4Da. The mathematical ligament approximation, shown in FIG. 4Db, is composed from some number of independent fibers. FIG. 4Db illustrates two fibers, the $k^{th}$ 446 and the $k^{th+1}$ 448 fibrils, which have been defined for the deep layer of the MCL. There is no theoretical limit to the number of fibrils which may be used to approximate the soft tissue structure. A larger number of fibrils will tend toward a more realistic model while fewer fibrils will reduce computational steps needed to solve the mechanical simulation. Prior work has demonstrated that two or three fibrils for each of the major ligament structures are sufficient for reasonably good approximation of the joints mechanical behavior.

A database of information is maintained for the entire collection of fibrils. Proximal and distal insertion sites, $p^f[x, y, z]$ and $p^f[x, y, z]$ respectively, are defined for each fibril. The chosen insertion sites approximate the geometry of the anatomical insertion site of the ligament. Initial coordinates for the fibrils represent the position of the insertion site in a reference pose with the knee at full extension, bearing no load, and at a natural neutral internal rotation. The x, y, and z coordinates, referenced to the tibial frame, OT, of each insertion site are stored for this reference pose. The database also maintains information describing the mechanical characteristics of each ligament fibril as a set of fitting coefficients for the non-linear elastic behavior (k1 and k2) and the strain rate dependent behavior (k3). In order to compute the strain at any time step, the unstrained length, 10, of each ligament fiber is defined. FIG. 4E is a schematic of a control system 400E for a prosthetic simulator featuring a virtual soft tissue model in form of a multi-fiber ligament algorithm, according to certain embodiments. The virtual soft tissue algorithm may model the soft tissue constraints due to ligaments, joints, and capsular structures (e.g., in a knee). The soft tissue, or multi-fiber ligament model 102, establishes a relationship between the current configuration of the prosthetic in the simulator device (where configuration means the relative positions and orientation of the prosthetic components) and the constraint force which emulates the elastic restoring force of the knee's soft tissue and ligament structure. The biomechanical virtual soft tissue model may be based on a multi-fiber algorithmic description of the knee's ligament and capsular structure and incorporate the model in a closed loop control system for simulator control.

Figure 3:
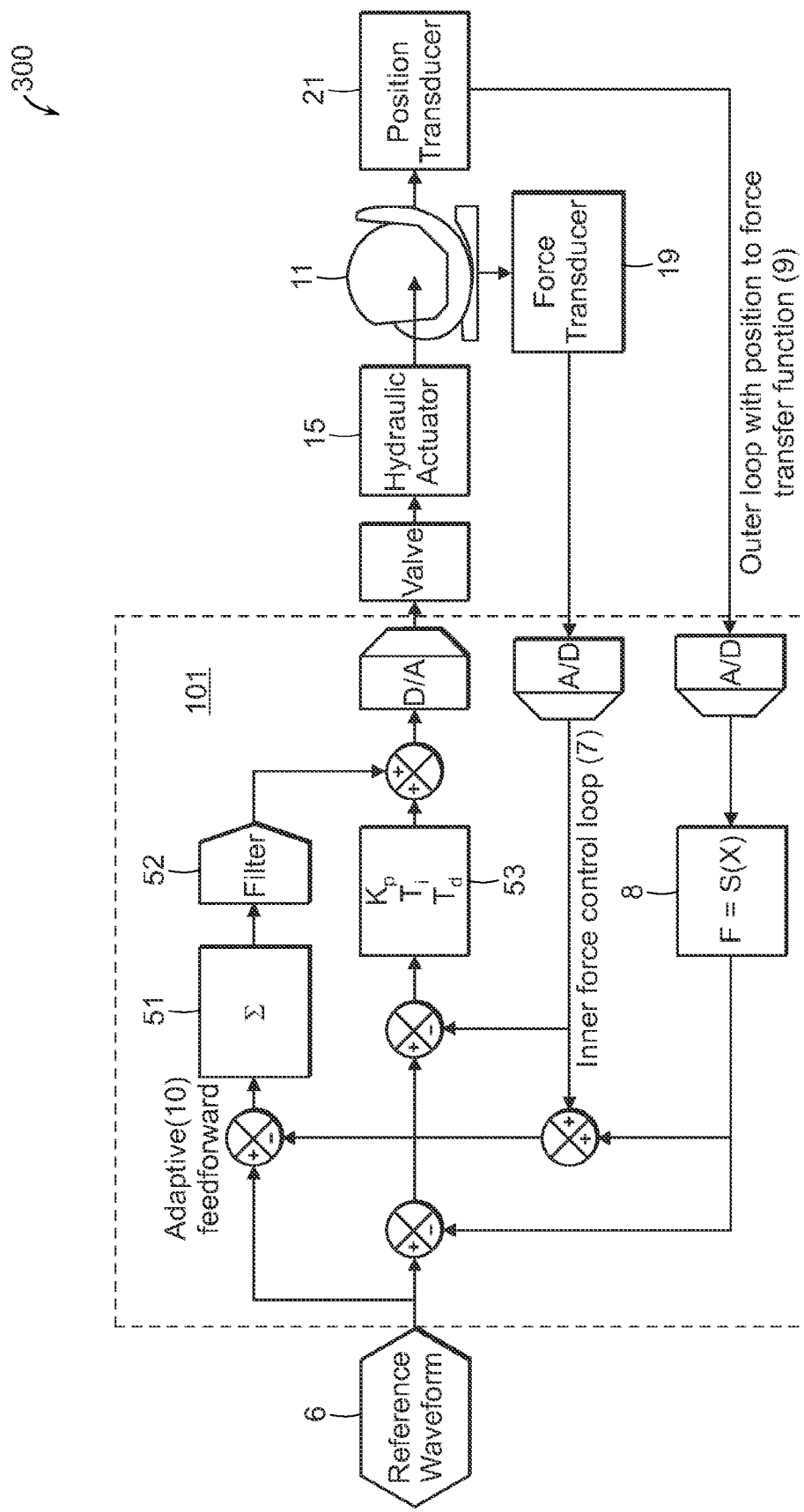
FIG. 3 is a schematic of a control system for a prosthetic simulator featuring a virtual soft tissue model in form of a cubic spline algorithm.

The biomechanical virtual soft tissue model 102 may be used in place of cubic spline algorithm 8 shown in FIG. 3. It should be appreciated that the simulator 101 of FIG. 4E may include equivalent components of the simulator 10 of FIG. 3.

Similar to the simulator of FIG. 3, the simulation of FIG. 4D includes a nested loop design featuring an inner loop 7 and an outer loop 9. The inner loop 7 utilizes feedback produced from the multi-axis force/torque transducer 19. The inner loop 7 also provides a traditional proportional integral derivative control (PID) via a discrete numeric algorithm 53. The nested loop design also includes an outer loop 9, which utilizes feedback from the position transducer 21. This position feedback provides the input to the biomechanical model. Plural positions transducer 21 as well as orientation transducers may be used (position and angular displacement sensors).

The angular inputs $\theta_x$, $\theta_y$, and $\theta_z$ correspond to flexion, varus-valgus, and internal rotation angles. The positional inputs $a_x$, $a_y$, and $a_z$ correspond to medial-lateral, anterior-posterior, and axial displacements of the prosthetic. These parameters are measured by appropriate position and orientation measurement instruments. The measured parameters all input to the multi-fiber ligament model 102 to permit calculation of the constraint force, including torque, with respect to each fiber, for any instant in time. Accordingly, within each iteration of the simulation of the soft tissue model, constraint force with respect to each fiber is calculated. The combination of the inner and outer loops functions as a feedback control system that drives the prosthetic drive mechanism. At each iteration, a measurement error from the previous iteration is employed to determine the drive signal for a subsequent iteration of the motion. The measurement error quantifies the difference between a driving waveform of the prosthetic device and a resulting force or motion of the prosthetic device.

It should be appreciated that all calculations provided by the multi-fiber ligament model may be performed in real time and online (e.g., without the use of an external computation system).

The Knee Model Computation

The control system may operate in time steps at a rate of 2000 Hz. Within the period between time steps, all of the required information is gathered and model and control calculations are performed. At the end of the time step period, all required control outputs are updated. At each time step the current configuration of the femur relative to the tibia is determined by position and angular sensors capable of measuring the three orthogonal position variables, $a_x$, $a_y$, and $a_z$, and the three independent angle variables $\theta_x$, $\theta_y$, and $\theta_z$. Let $p_j^t$ and $p_j^f$ denote position vectors from the tibial origin to the $j^{th}$ ligament insertion sites in the reference position, on the tibia ($p_j^t$) and the femur ($p_j^f$). Let $s_j^t$ and $s_j^f$ designate position vectors from the tibial origin to the $j^{th}$ ligament fiber insertion sites on the tibia ($s_j^t$) and the femur ($s_j^f$) after undergoing an arbitrary change in position and or orientation. Components of the position vectors are designated: $s_j^t$, $s_j^f$, $p_j^t$, $p_j^f$, etc.

At any arbitrary position and orientation of the femur relative to the tibia, the position vector designating the $j^{th}$ ligament fiber insertion site for the femur is calculated using the rotational and translational matrices (equations (g) and (h)):

$$s_j^f = A + R \cdot p_j^f \quad \text{(i)}$$

As the measurement system has been established so that all motion is expressed relative to a stationary tibia the tibial insertion site coordinates are simply:

$$s_j^t = p_j^t \quad \text{(j)}$$

The length of the $j^{th}$ ligament fiber, $l_j$, may be calculated from the components of the position vectors $s_j^t$ and $s_j^f$:

$$l_j = \sqrt{(s_{jx}^f - s_{jx}^t)^2 + (s_{jy}^g + s_{jy}^t)^2 + (s_{jz}^f + s_{jz}^t)^2} \quad \text{(k)}$$

The strain in the $j^{th}$ ligament fiber, $\epsilon_j$, may be obtained as:

$$\epsilon_j = \frac{l_j - l_{0j}}{l_{0j}} \quad \text{(l)}$$

where $l_{0j}$ is the unstrained length of the $j^{th}$ ligament fiber (possibly obtained from a database). The strain rate is determined from the strain at the previous time step, $\epsilon_{0j}$, and the current strain as:

$$\frac{d\epsilon}{dt} \approx (\epsilon_0 - \epsilon_{0j})/\Delta t \quad \text{(m)}$$

where $\Delta t = t - t_0$.

The stress in the $j^{th}$ ligament fiber may be calculated as:

$$\sigma_j = (k_1 \cdot \epsilon_j^2 + k_2 \cdot \epsilon_j)\left(1 + k_3 \cdot \frac{d\epsilon_j}{dt}\right) \quad \text{(n)}$$

The fibril tension force, $f_j$, may be determined as:

$$f_j = \sigma_j \cdot c_j \quad \text{(m)}$$

where $c_j$ is the cross sectional area of the $j^{th}$ ligament fiber. Further, direction cosines may be calculated for the $j^{th}$ ligament fiber:

$$\cos \phi_{xj} = (s_{xj}^f - s_{xj}^t)/l_j$$

$$\cos \phi_{yj} = (s_{yj}^f - s_{yj}^t)/l_j$$

$$\cos \phi_{zj} = (s_{zj}^f - s_{zj}^t)/l_j \quad \text{(n)}$$

The terms $\phi_{xj}$, $\phi_{yj}$, and $\phi_{zj}$ denote the angles between the $j^{th}$ ligament fiber and the terms x, y, and z denote the axes of the tibial reference frame.

The components of tension force on each axis arising from each fiber may be calculated as:

$$f_{xj} = \cos \phi_{xj} \cdot f_j^t$$

$$f_{yj} = \cos \phi_{yj} \cdot f_j^t$$

$$f_{zj} = \cos \phi_{zj} \cdot f_j^t \quad \text{(o)}$$

The moment of force resulting from the tension in each ligament fiber referenced to the tibial origin may be calculated as the cross product of the tibial insertion site position-vector and the force vector representing the fibril tension:

$$m_j = p_j^t \times f_j \quad \text{(p)}$$

The final step in the calculation of the soft tissue constraint is the summation of the individual fibril force and moment components into three orthogonal force components and three orthogonal moment components:

$$F_x = \sum_{j=0}^{n} f_{xj} \quad F_y = \sum_{j=0}^{n} f_{yj} \quad F_z = \sum_{j=0}^{n} f_{zj} \quad \text{(q)}$$

$$M_x = \sum_{j=0}^{n} m_{xj} \quad M_y = \sum_{j=0}^{n} m_{xj} \quad M_z = \sum_{j=0}^{n} m_{xj}$$

In anatomical terms, $F_x$ is the medial-lateral constraint force, $F_y$ is the anterior-posterior constraint force, and $F_z$ is the axial constraint force. The moment $M_x$ is close to zero as the joint provides little passive resistance to flexion-extension, the moment $M_y$ is the resistance to varus-valgus rotation, and the moment $M_z$ is the resistance to axial rotation (internal-external rotation). This ensemble of forces and moments may be used to mitigate the control system drive-signals.

Figure 4F:
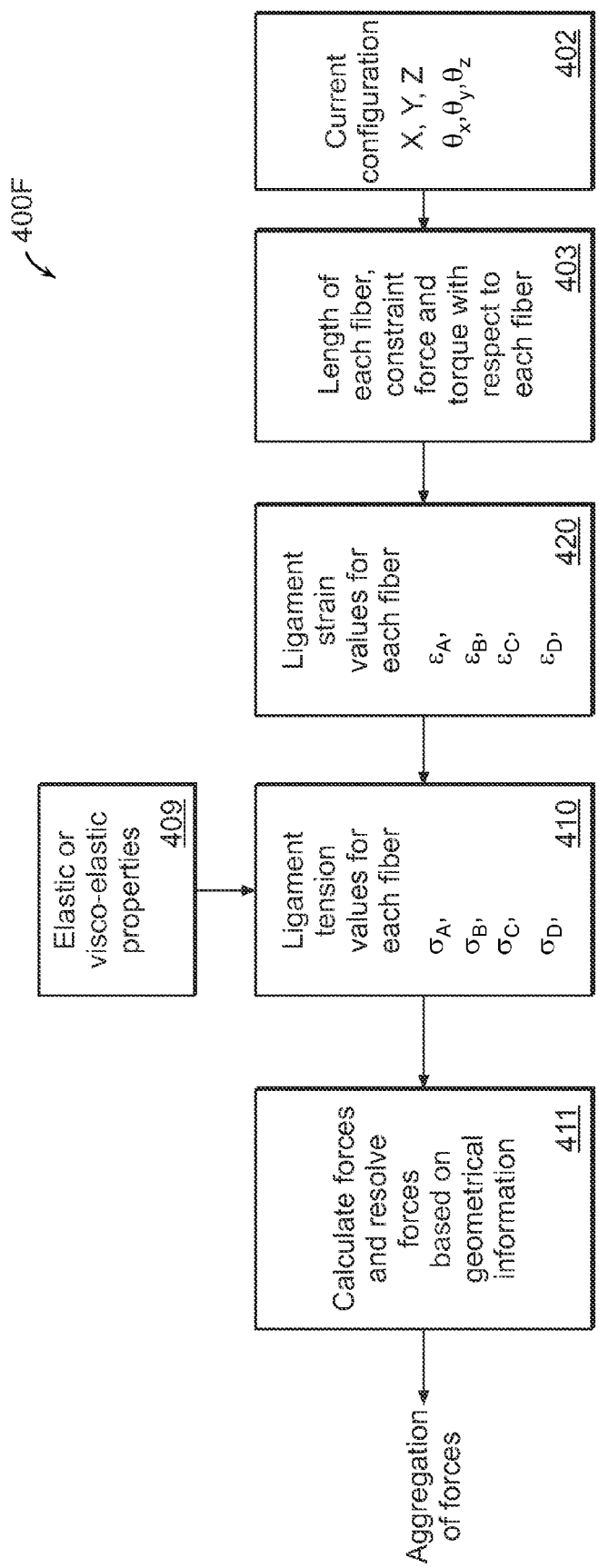
FIG. 4F is an illustration of determining force constraints.

FIG. 4F is a high-level illustration of procedures 400F involved in determining constraints encountered by displacement of the prosthetic element, with respect to each fiber, when implemented in the body. The current configuration of the prosthetic, including angular inputs $\theta_x$, $\theta_y$, and $\theta_z$ and positional inputs $a_x$, $a_y$, and $a_z$ 402 are used to obtain factors relating to constraint force, including torque. A mathematical ligament approximation, as described above, may be composed of some number of independent fibers. First, length of each fiber, based on position of insertion points is calculated. Constraint force and torque, with respect to each fiber, for any instant of time, may also be calculated 403. Using these values, corresponding ligament strain 420 values may be determined. For example, assuming that four ligament fibers, namely fibers A, B, C, and D are employed, corresponding strain values $\epsilon_A$, $\epsilon_B$, $\epsilon_C$, and $\epsilon_D$ for each fiber may be determined. Using these strain values, corresponding ligament tension values, $\sigma_A$, $\sigma_B$, $\sigma_C$, and $\sigma_D$, are obtained. Elastic or visco-elastic properties of ligaments 409 may also be used to determine the ligament tension values 410. The tension values 410 are used to determine and resolve current forces on the prosthetic 402.

In certain embodiments, the current configuration 402 may be used to determine a change in the position (i.e., displacement) of the prosthetic element, and eventually determine an error that quantifies the difference between a driving waveform of the prosthetic device and a resulting force or motion of the prosthetic device. The calculated error is used to determine the drive signal of the next iteration.

The multi-fiber ligament soft tissue model may employ any number of ligament fibers with geometry and properties thereof providing information of the biomechanics of the knee. In certain embodiments, individual ligaments, one or more ligament structures or one or more groups of ligaments may be employed. Ligament structures may be chosen to correspond to what would be expected to result from actual medical procedures.

There is no theoretical limit to the number of fibers that may be used to approximate the soft tissue structure. By using a larger number of fibers, embodiments may obtain a more realistic model while fewer fibers will reduce computational steps needed to solve the mechanical simulation. In certain embodiments, it is assumed that two or three fibers for each of the major ligament structures are sufficient to obtain a reasonable approximation of the joints mechanical behavior.

Database of information may be maintained for the entire collection of fibers. Further, proximal and distal insertion sites, $p^f: (x_f, y_f, z_f)$ and $p^t: (x_t, y_t, z_t)$ respectively, may be defined for each fiber. The chosen insertion sites approximate the geometry of the anatomical insertion site of the ligament. Initial coordinates for the fibers represent the position of the insertion site in a reference pose with the knee at full extension, bearing no load, and at a natural neutral internal rotation. The x, y, and z coordinates, referenced to the tibial frame, $O_T$, of each insertion site may be stored for this reference pose. The database may further maintain information describing the mechanical characteristics of each ligament fiber as a set of fitting coefficients for the non-linear elastic behavior ($k_1$ and $k_2$) and the strain rate dependent behavior ($k_3$). In order to compute the strain at any time step, the unstrained length, $l_0$, of each ligament fiber is defined. The ligament strain $\epsilon$ may be determined using equation (l). Specifically, unstrained length or the initial distance between ligament insertion sites and extended distance between ligament insertion sites may be used.

Figure 5C:
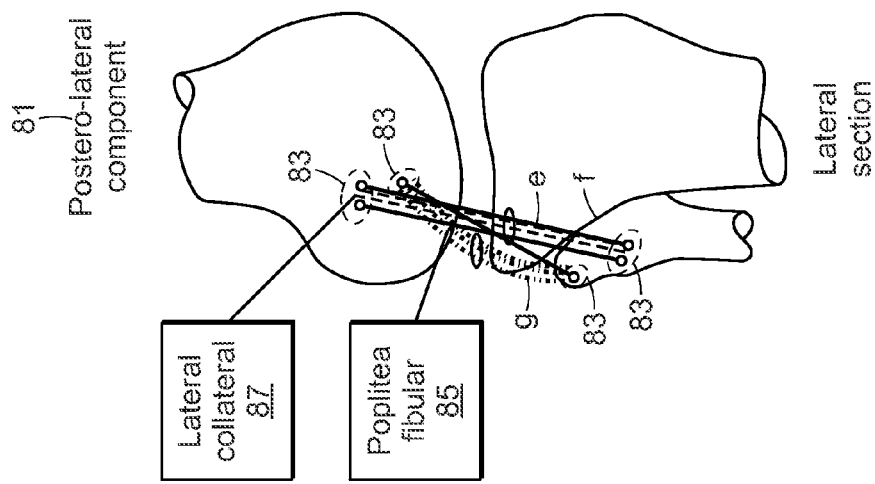
FIGS. 5A, 5B, and 5C illustrate an example representation of multi-fiber ligament structures incorporated at a knee.
Figure 5B:
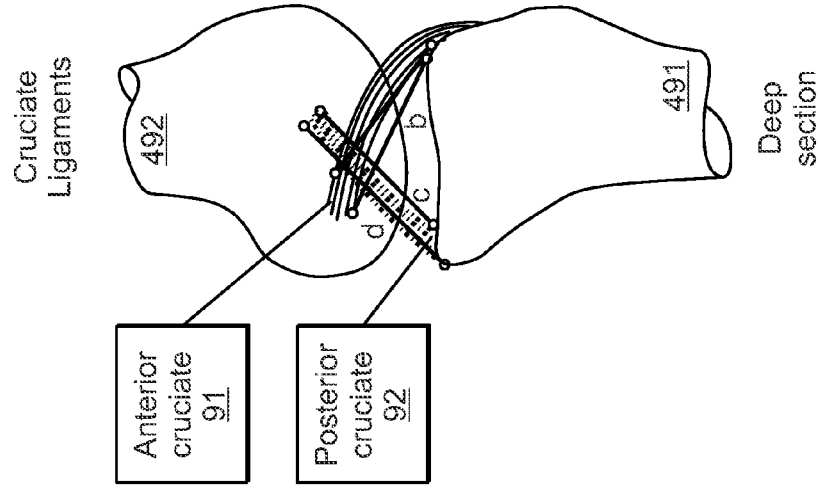
Figure 5A:
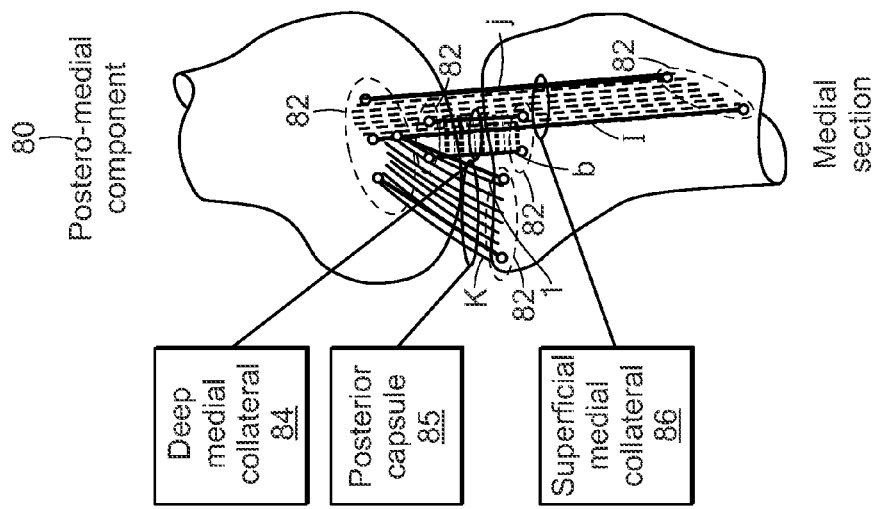

FIGS. 5A-5C illustrate an example representation of ligament structures used for modeling mechanical structure of the knee. As shown in FIGS. 5A-5C, the multi-fiber ligament soft tissue model may include ligament fibers of the posteromedial 80 and/or the posterolateral 81 components. The posteromedial component 80 may include information on the geometry and properties of posteromedial ligament insertion sites 82, deep medial collateral 84, posterior capsule 85, and superficial medial collateral 86. The posterolateral component 81 may include information on the geometry and properties of posterolateral insertion sites 83, popliteo fibular 85, and lateral collateral 87. Additionally, the multi-fiber ligament soft tissue model may consider the fact that fiber properties can change with movement. Other forces such as adjacent muscles and gravity may also be considered.

The soft tissue model may also include ligament fibers connected between the femoral component 492 and the tibial component 491, as shown in FIG. 5B. Ligament fibers (a) and (b) represent the anterior cruciate 91 ligament ACL, which is normally resected during total knee arthroplasty (TKA). Ligament fibers (c) and (d) represent the portion of the posterior cruciate 92 ligament (PCL), which is dependent on cruciate sparing. Ligament fibers (e), (f), and (g) represent the lateral collateral ligament (LCL), while ligaments (h), (I), and (j) represent the medial collateral ligament (MCL). Ligaments (k) and (l) represent the posterior capsule.

The posteromedial 80, posterolateral 81, femoral 90, and tibial 91 components may further include information on the geometry and properties of quadratic force-displacement; ligament force displacement; linear stiffness; aggregate tangent stiffness; and in situ strain. The biomechanical information employed in the multi-fiber ligament soft tissue model may be obtained through the use of cadaveric knee studies.

These ligaments constitute the major passive load bearing structure of the knee and when intact, these structures afford the knee mechanical stability. Surgical procedure and post-operative ligament condition impact the mechanical (and clinical) outcome of the procedure. Different implant devices and surgical strategies often require the removal of one or both of the anterior and posterior cruciate ligaments. To accommodate these variations in procedure the cruciate ligaments may be removed in the model to simulate surgical conditions. Similarly, the condition and laxity of the medial collateral ligament layers may play a significant part in the kinematics of the joint. To accommodate such variation the laxity and stiffness of the modeled ligament fibers may also be adjusted to achieve the desired mechanical behavior. Each of the ligament structures requires one or more fibers for mechanical representation. Each fiber in turn requires the definition of the above geometrical and mechanical data in the software database. In FIGS. 5A-5C, the modeled individual fibers are shown as dark lines with circles at the geometrical insertion sites. Each ligament may be modeled in software with a bundle comprised of multiple fibers each with its own mechanical properties and geometrical insertion site.

Figure 6B:
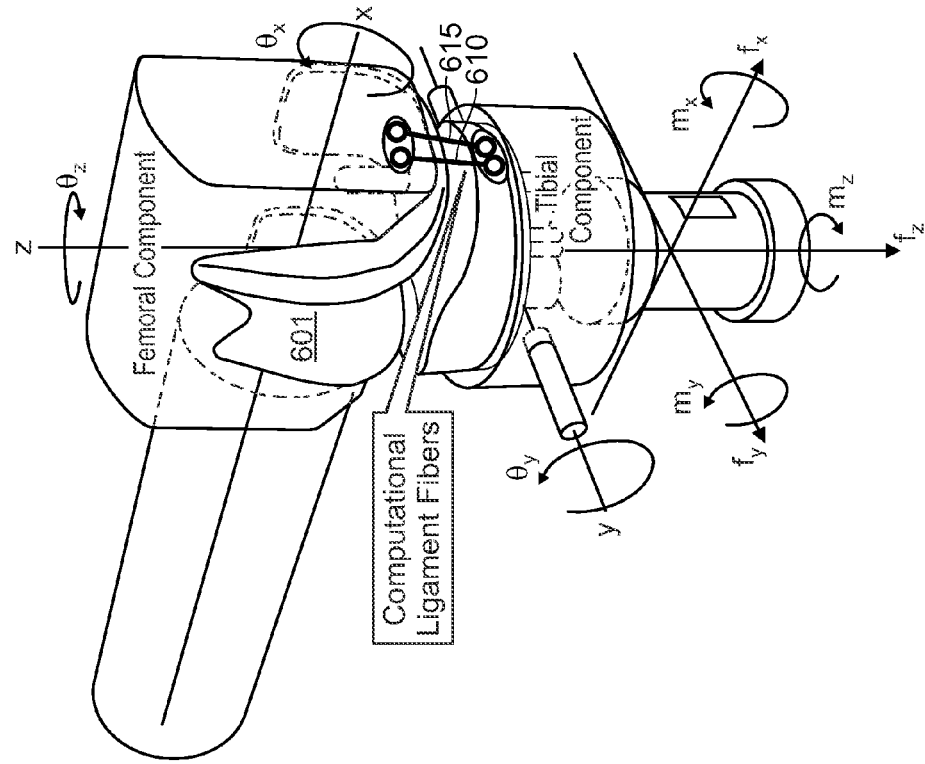
FIG. 6B illustrates a prosthetic knee mounted in a simulator station.
Figure 6A:
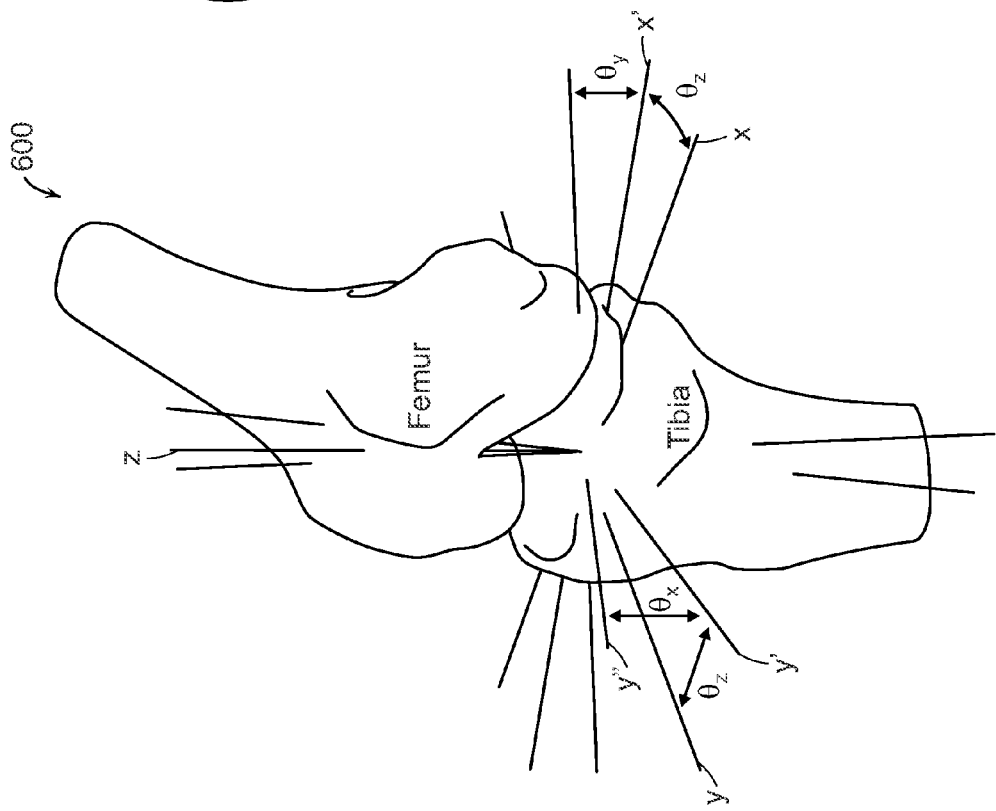
FIG. 6A illustrates a natural knee.

FIG. 6A illustrates a natural knee 600. FIG. 6B illustrates a prosthetic knee 601 mounted in a simulator station. The rotational motions of the simulator are identified as $\theta_x$, $\theta_y$, and $\theta_z$ corresponding to anatomical rotations of flexion-extension, abduction-adduction and internal-external rotation. Translations along the x, y, and z axes correspond to anatomical medial-lateral, anterior-posterior and compression-distraction translations respectively. The joint reaction forces $F_x$, $F_y$, and $F_z$ and moments $M_x$, $M_y$, and $M_z$ are communicated to a multi-axis force transducer beneath the tibial component. Two computational ligament fibers 610, 615, representing the deep fibers of the medial collateral ligament, are shown. The full computational model may be comprised of fifteen or more fibers (see FIGS. 5A-5C) that represent the seven primary ligaments and capsule structures. The simulator is comprised of a plurality of servo-hydraulic or electro-mechanical actuators that drive the rotational and translational motions. The motions may be monitored via a plurality of measurement instruments such as linear and rotary potentiometers to determine the current position and orientation of the femoral and tibial components. These position and orientation measurements along with the joint reaction forces and torques are filtered, conditioned, and digitized with an analog to digital converter. The digitized measurements are read by a digital signal processor system and are available to drive the control and computational algorithms.

Figure 7:
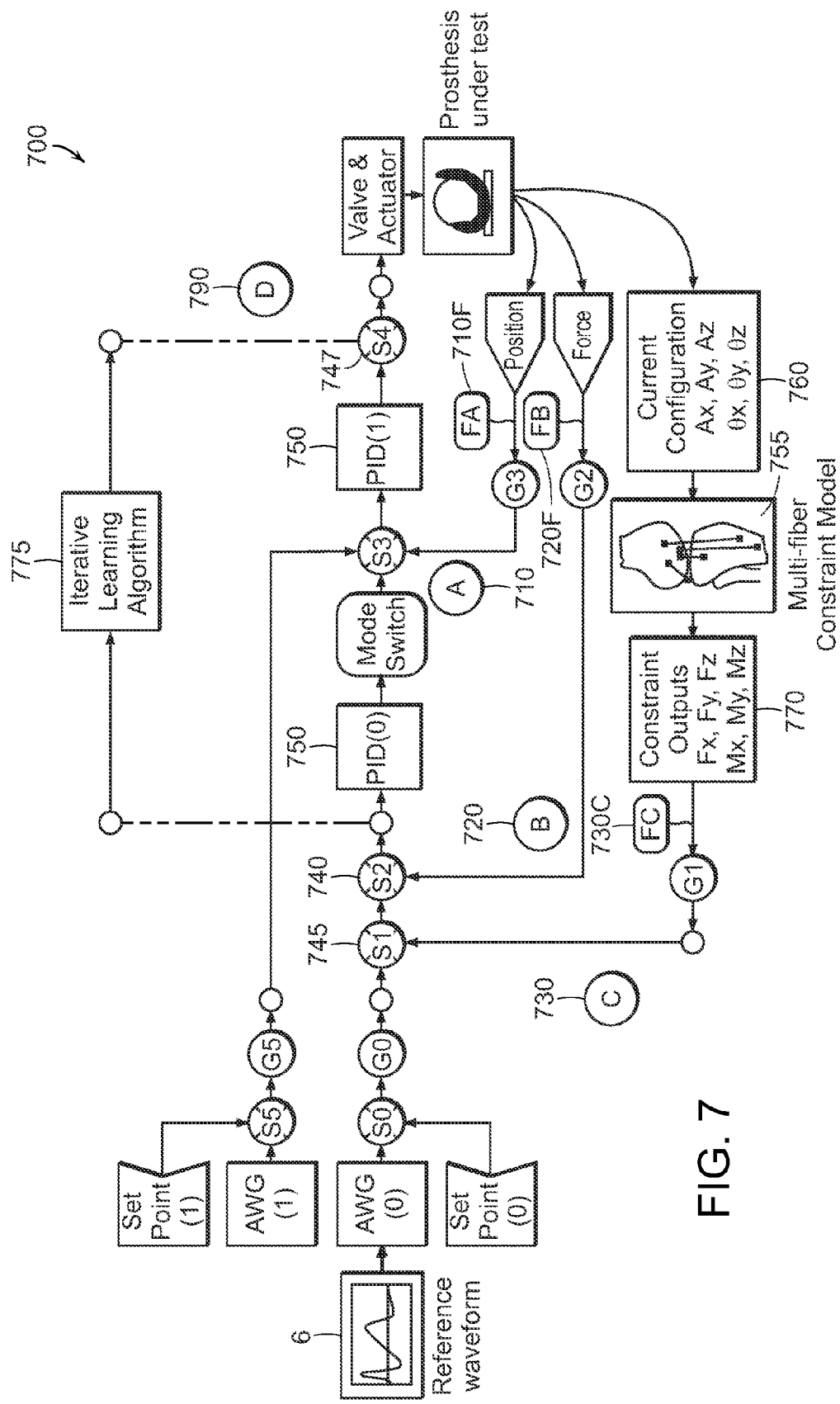
FIG. 7 is an illustration of certain embodiments of the invention that employ a feedback control system to perform soft tissue control.

FIG. 7 is an illustration 700 of certain embodiments of the invention that employ a feedback control system to perform soft tissue control. A similar high-level illustration of the control system in FIG. 4D. Each controlled axis of motion is driven by a similar loop. The loop design is flexible to accommodate the different needs of the several actuator channels. An ensemble of kinetic and kinematic signals controls the motions and forces produced by the simulator machine (e.g., reference waveform 6). Each reference waveform 6 may be a temporal series of data that governs the force, torque, displacement or angle (as appropriate to each channel) over one cycle of motion. In certain embodiments, the flexion motion may be placed under angular displacement control, internal-external rotation under torque control, while varus-valgus is permitted free rotation. Axial motion (compression-distraction) may be placed under force control. Further, anterior-posterior displacement may be placed under force control while medial-lateral motion is permitted free translation.

The axes of motion that are placed under force or torque control benefit from the virtual soft tissue control. The displacement controlled motions and the free motions do not directly rely on the virtual soft tissue model. However, these motions are monitored with suitable instruments to determine the current configuration of the prosthesis components.

The control system 700 includes several nested control loops 710, 720, 730, 740 identified by A, B, C, and D. The corresponding feedback signals 710F, 720F, 730F are indicated FA, FB, FC and FD. The setup of the control system is very flexible and permits mapping of various feedback signals and or drive signals into different control channels.

Loop 710, labeled as loop A, is the innermost loop. This loop is a position control loop used largely for control of the machine actuators during setup of samples prior to operation of the machine. The Mode Switch controls several gain and control law parameters to permit bump-less transfer between virtual soft tissue mode and position control mode. The control law for this loop follows the standard form PID control law where:

$$e(n) = y_{ref}(n) - y(n) \tag{r}$$

$$u(n) = K_p e(n) + K_i \sum_{k=0}^{n} e(k) + K_d(e(n) - e(n-1)) \tag{s}$$

The error signal is defined by equation (r) as the difference between the $y_{ref}(n)$ and $y(n)$ which are respectively, the nth value of the reference signals and the nth value of the measured process variable (in this case position). The value u(n) is the nth output sample supplied to the actuator, e(n) is the nth error sample, $K_p$, $K_i$, and $K_d$ are user settable gains for proportional, integral and derivative action of the control loop (PID) 750.

When operating in the virtual soft tissue control mode, this loop may be eliminated by setting the controller parameters to produce a transfer function of unity while forcing the feedback signal to null.

Loop 720, labeled as loop B, is setup for force and/or torque control, depending on the actuator channel being controlled. Similar to loop A 710, this loop 720 is a standard form PID loop which implements the control law described by equations (r) and (s). In this case, $y_{ref}(n)$ reference input 6 will correspond to $f_{active} - f_{passive}$, which, as explained previously, is the balance of the force which must be supplied by the contact mechanics of the prosthesis to satisfy the force equilibrium requirement described in equation (d). The feedback signal at point FB 720F, corresponds to y(n) and is the measured contact force or torque representing the joint reaction force resulting from material contact of the prosthetic components.

The signal $f_{active} - f_{passive}$ representing $f_{contact}$ may be calculated in another loop 730 (Loop C, described below). This difference is presented to summing junction S2 740, where the error signal is calculated by subtracting the measured contact force. The loop acts as a conventional force control loop and attempts to servo the measured contact force to a level equivalent to the active force less the passive force computed by the soft tissue model.

Loop 730, labeled as loop C, relates to the soft tissue control system. This loop relies on the multi-fiber constraint model 755. The multi-fiber constraint model 755 accepts the current configuration 760 in terms of measured position ($A_x$, $A_y$, and $A_z$) and orientation ($\theta_x$, $\theta_y$, and $\theta_z$) measurements. The analytical calculations described above are carried out in real time (e.g., at 2000 samples per second) to determine the constraint outputs 770 in terms of passive force ($f_x$, $f_y$, and $f_z$) and torque ($m_x$, $m_y$, and $m_z$) constraint values. Depending on the channel usage, these values represent $f_{passive}$ in equilibrium equation (d). A single model computational block may serve all channels. The model may accept six kinematic inputs 760 and produces six kinetic outputs 770. The kinetic outputs 770 are mapped to the proper actuator control channel to satisfy the equilibrium equation. The computed passive forces and torques 770 are subtracted from the active force signals at summing junction S1 745 in each of the six channels of the controller. In some embodiments, four control channels, namely channels for compression-distraction, anterior-posterior translation, medial-lateral translation, and internal-external rotation, are placed under virtual soft tissue control.

The output of summing junction S1 745 represents the difference $f_{active} - f_{passive}$, which in turn is communicated to summing junction S2 740.

Loop 790, labeled as loop D, is an iterative learning control (ILC) loop wrapped around the entire control loop. The ILC loop includes an iterative learning control algorithm 775 that acts on entire sets of data representing one cycle of motion of the simulator. The ILC algorithm 775 has several memory arrays that maintain a full cycle of data over the period of the modeled activity. An error signal $e_p(t)$ is maintained in one memory array, while a second array is used to accumulate a feed forward signal, which is summed with the real time control signal at summing junction S4 747. The ILC control law may be described by:

$$v_{p+1}(t) = v_p(t) + k_{lo} e_p(t) \quad 0 \le t \le T \tag{t}$$

where $v_{p+1}(t)$ is the updated control signal, $v_p(t)$ is the prior iteration of the control signal, $k_{lo}$ is the learning control gain, and $e_p(t)$ is the error signal, t is the time and T is the period of the cyclic activity.

Due to the sliding contact nature of prosthetic component contact, the joint reaction force may be dominated by frictional force. The complex motions result is multiple motion reversals during the course of one cycle, and at each motion reversal, breakaway forces may occur. Typically, frictional breakaway is accompanied by chatter and noise and high instantaneous force levels. Under strict PID control, these anomalies are difficult to impossible to control. The ILC algorithm 775 overcomes these difficulties and facilitates smooth accurate tracking performance.

While the above example embodiment related to a testing system for a prosthetic knee implant, it should be appreciated systems may be developed to perform wear tests on prosthetics for other parts of the body.

It should be understood that procedures, such as those illustrated by flow diagrams or block diagrams herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be coded and executed by a processor in a manner understood in the art.

While this invention has been particularly shown and described with references to preferred embodiments thereof, it will be understood by those skilled in the art that various changes in form and details may be made therein without departing from the scope of the invention encompassed by the appended claims.

What is claimed is:

1. A simulator for driving a prosthetic element, comprising:
a prosthetic drive mechanism that drives the prosthetic element;
a sensor that measures force applied to the prosthetic element;
displacement sensors that measure displacement of the prosthetic element; and
a control system responsive to the sensors and to a simulation input to drive the prosthetic drive mechanism, the control system including a computational model that incorporates representations of plural individual ligaments, wherein each ligament is represented by at least two fibers, the mechanical properties of each fiber are independently defined and adjustable, each end of each fiber is attached to at least one insertion site during simulated joint motion, said sites independently defined and adjustable in a three-dimensional space, the system configured to define insertion sites not limited to anatomical insertion sites geometry; the model responding to the displacement sensors to determine length of each ligament fiber, based on position of the fiber's insertion sites, and, using the mechanical properties and length of each fiber, determine constraint forces or torques with respect to each ligament fiber, the control system combining the determined constraint forces or torques and the measured force with the stimulation input to drive the prosthetic drive mechanism.

2. The simulator of claim 1 wherein the mechanical properties of the fibers include visco-elastic properties of the fibers.

3. The simulator of claim 1 wherein the displacement sensors include position and angular displacement sensors.

4. The simulator of claim 1 wherein the control system comprises a nested loop design.

5. The simulator of claim 1 wherein the model further responds to the displacement sensors to determine strain in each fiber, based on the length of each fiber, and stress in each fiber, based on the mechanical properties of and strain in each fiber.

6. The simulator of claim 5 wherein stress in each fiber is determined by calculating a time-independent quantity representing strain-dependent stiffness and a time-dependent quantity providing strain-rate dependent stiffness and hysteresis.

7. A control system for use in driving a prosthetic element, the control system comprising:
a database storing representations of plural individual ligaments, wherein each ligament is represented by at least two fibers, the mechanical properties of each fiber are independently defined and adjustable, each end of each fiber is attached to at least one insertion site during simulated joint motion, said sites independently defined and adjustable in a three-dimensional space, the system configured to define insertion sites not limited to anatomical insertion sites geometry; and
a processor executing a computational model that incorporates the representations of the ligament fibers and responds to displacement sensors that measure displacement of the prosthetic element, to determine length of each ligament fiber, based on position of the fiber's insertion sites, and, using the mechanical properties and length of each fiber, determine constraint forces with respect to each ligament fiber,
the control system combining the determined constraint forces and a measured force applied to the prosthetic element with a simulation input to drive a prosthetic drive mechanism that drives the prosthetic element.

8. The control system of claim 7 wherein the model further responds to the displacement sensors to determine, strain in each fiber based on the length of each fiber, and stress in each fiber, based on the mechanical properties of and strain in each fiber.

9. The control system of claim 8 wherein stress in each fiber is determined by calculating a time-independent quantity representing strain-dependent stiffness and a time-dependent quantity providing strain-rate dependent stiffness and hysteresis.

10. A simulator for driving a prosthetic element, comprising:
a prosthetic drive mechanism configured to drive the prosthetic element during an accelerated wear test of the prosthetic element;
a sensor mechanism that measures force applied to the prosthetic element;
position and angular displacement sensors that measure displacement of the prosthetic element;
a simulation input representing action of the simulator; and
a closed loop feedback control system responsive to the sensors to determine a drive signal for the drive mechanism, the control system including a computational model that incorporates mechanical representations of plural individual ligaments, wherein each ligament is represented by at least two fibers, the mechanical properties of each fiber are independently defined and adjustable, each end of each fiber is attached to at least one insertion site during simulated joint motion, said sites independently defined and adjustable in a three-dimensional space, the system configured to define insertion sites not limited to anatomical insertion sites geometry; the model responding to the position and angular displacement sensors to determine length of each ligament fiber, based on position of the fiber's insertion sites, and, using the mechanical properties and length of each fiber, determine constraint forces with respect to each ligament fiber, the control system combining the determined constraint forces and measured force with the simulation input to determine the drive signal.

11. The simulator of claim 10 wherein the model further responds to the position and angular displacement sensors to determine strain in each fiber, based on the length of each fiber, and stress in each fiber, based on the mechanical properties of and strain in each fiber.

12. The simulator of claim 11 wherein stress in each fiber is determined by calculating a time-independent quantity representing strain-dependent stiffness and a time-dependent quantity providing strain-rate dependent stiffness and hysteresis.

13. A method of driving a prosthetic element in a simulator comprising:
providing a computational model that incorporates representations of plural individual ligaments, wherein each ligament is represented by at least two fibers, the mechanical properties of each fiber are independently defined and adjustable, each end of each fiber is attached to at least one insertion site during simulated joint motion, said sites independently defined and adjustable in a three-dimensional space;

applying a simulation input to a control system that drives the prosthetic element, the system configured to define insertion sites not limited to anatomical insertion sites geometry;

sensing force applied to the prosthetic element;

sensing displacement of the prosthetic element;

in the computational model, responding to the sensed displacement to determine length of each ligament fiber, based on position of the fiber's insertion sites, and, using the mechanical properties and length of each ligament fiber, determine constraint forces with respect to each fiber;

combining the simulation input with the determined constraint forces and the measured force in driving the prosthetic element.

14. The method of claim 13 wherein the mechanical properties of the fibers include visco-elastic properties of the fibers.

15. The method of claim 13 wherein sensing displacement includes sensing position and angular displacement.

16. The method of claim 13 wherein responding to the sensed displacement further includes responding to the sensed displacement to determine strain in each fiber, based on the length of each fiber, and stress in each fiber, based on the mechanical properties of and strain in each fiber.

17. The method of claim 16 wherein stress in each fiber is determined by calculating a time-independent quantity representing strain-dependent stiffness and a time-dependent quantity providing strain-rate dependent stiffness and hysteresis.

* * * * *